(12) United States Patent
Timm

(10) Patent No.: US 8,359,819 B1
(45) Date of Patent: Jan. 29, 2013

(54) LAKE WEED HARVESTER

(76) Inventor: Dennis W Timm, Waupaca, WI (US)

( * ) Notice: Subject to any disclaimer, the term of this patent is extended or adjusted under 35 U.S.C. 154(b) by 273 days.

(21) Appl. No.: 12/687,107

(22) Filed: Jan. 13, 2010

Related U.S. Application Data

(60) Provisional application No. 61/144,385, filed on Jan. 13, 2009.

(51) Int. Cl.
*A01D 44/00* (2006.01)
(52) U.S. Cl. .............................................. 56/9
(58) Field of Classification Search .............. 56/8, 9
See application file for complete search history.

(56) References Cited

U.S. PATENT DOCUMENTS

| | | | | |
|---|---|---|---|---|
| 3,347,029 | A * | 10/1967 | Grinwald | 56/9 |
| 3,653,192 | A * | 4/1972 | Bryant | 56/1 |
| 4,070,978 | A * | 1/1978 | Virgilio | 114/26 |
| 4,258,534 | A * | 3/1981 | Bryant | 56/9 |
| 4,520,616 | A * | 6/1985 | Stewart et al. | 56/9 |
| 4,592,155 | A * | 6/1986 | Mustonen | 37/307 |
| 5,020,307 | A * | 6/1991 | Gutsche | 56/8 |
| 5,404,696 | A | 4/1995 | Vasby | |
| 6,832,465 | B2 * | 12/2004 | Horvath et al. | 56/9 |
| 7,045,058 | B2 * | 5/2006 | Walczyk | 210/170.05 |
| 7,326,020 | B2 * | 2/2008 | Thomas et al. | 414/137.7 |

OTHER PUBLICATIONS

Jenson Lake Mower, viewed at www.lakemower.com/features on Feb. 21, 2011 (6 pages).

* cited by examiner

*Primary Examiner* — Thomas B Will
*Assistant Examiner* — Mai Nguyen
(74) *Attorney, Agent, or Firm* — Brannen Law Office, LLC

(57) ABSTRACT

The present invention relates to lake weed harvester, and in particular to a machine that removes lake weed and deposits it via a transport assembly onto a hopper, and then removes the lake weed via the same transport assembly from the hopper. In one embodiment, the harvester comprises a boat supporting a deck, a hopper, a control station and a transport assembly operable from the control station. The transport assembly can have a conveyor and a roller that combine to pull weeds at their roots. The transport assembly can pivot between a first position wherein weeds are harvested and deposited via an inclined plane into a hopper, and a second position wherein the weeds are removed from the hopper and transported to a disposal point also via an inclined plane. The transport assembly can selectively oriented under operation of actuators.

19 Claims, 7 Drawing Sheets

LAKE WEED HARVESTER

This utility patent application claims priority on and the benefit of provisional application 61/144,385 filed Jan. 13, 2009, the entire contents of which are hereby incorporated herein by reference.

BACKGROUND OF THE INVENTION

1. Field of the Invention

The present invention relates to lake weed harvester, and in particular to a machine that removes lake weed and deposits it via a transport assembly onto a hopper, and then removes the lake weed via the same transport assembly from the hopper to a disposal or deposit point.

2. Description of the Related Art

Lake and other aquatic weeds provide a multitude of undesirable effects. Among them are odors, impedance of navigation and recreational use, deposits onto water vessels and unsightliness.

Because of these and other reasons, tools and machines have been developed over the years to combat the growth of lake weed.

The most basic tools are hand tools that attempt to cut and/or pull the weeds. Of course, the operation of hand tools is labor intensive both in effort and time.

Other attempted solutions utilize herbicides and/or chemicals. Yet, there may be environmental concerns associated with the use of chemicals and herbicides.

Still other attempts utilize machines in an attempt to control the aquatic growth. One such product is called a Jenson Lake Mower. This product is a boat mounted cutter. While this mover may work well for its intended purposes, it does not address the issue of collecting and disposing the aquatic growth.

U.S. Pat. No. 5,404,696 to Vasby is titled Aquatic-Weed Removal Machine. This patent describes a machine with a paddle wheel equipped with a hinged plate connected to the peripheral edge of each paddle in a manner such that as the wheel rotates, individual plates pivot from an inward folded position at the edge of the paddles to a radially extended one. The plates move into pressing contact with the top of a tangentially moving conveyor whereby weeds are held by the belt and removed as the belt and machine move.

U.S. Pat. No. 6,832,465 to Horvath et al. is titled Aquatic Weeding Device. This patent shows a weeding element and a weed transporter being at opposed ends of a vessel.

None of these devices show a compact weeding harvester with a compact design.

None of these devices show a single integrated collection and removal transport assembly.

Thus there exists a need for a lake weed harvester that solves these and other problems.

SUMMARY OF THE INVENTION

The present invention relates to lake weed harvester, and in particular to a machine that removes lake weed and deposits it via a transport assembly onto a hopper, and then removes the lake weed via the same transport assembly from the hopper to a disposal or deposit point. In one embodiment, the harvester comprises a boat supporting a deck, a hopper, a control station and a transport assembly operable from the control station. The transport assembly can have a conveyor and a roller that combine to pull weeds at their roots. The transport assembly can pivot between a first position wherein weeds are harvested and deposited via an inclined plane into a hopper, and a second position wherein the weeds are removed from the hopper and transported to a disposal point also via an inclined plane. The transport assembly can be selectively oriented under operation of actuators.

According to one advantage of the present invention, the harvester is compact in size. This allows the harvester to be easily maneuverable in the water.

According to another advantage of the present invention, the harvester comprises a transport assembly that both removes weed from the water and also deposits the weed to a removal point from the harvester. This is advantageously accomplished with a pivoting transport assembly that eliminates the need for two distinct conveying assemblies for removal and disposal, respectively.

According to a further advantage of the present invention, the operation of the harvester is controlled at a single control station.

According to a still further advantage of the present invention, the harvester operates free of harmful chemical or herbicides.

Other advantages, benefits, and features of the present invention will become apparent to those skilled in the art upon reading the detailed description of the invention and studying the drawings.

DETAILED DESCRIPTION OF THE PREFERRED EMBODIMENTS

Figure 1:
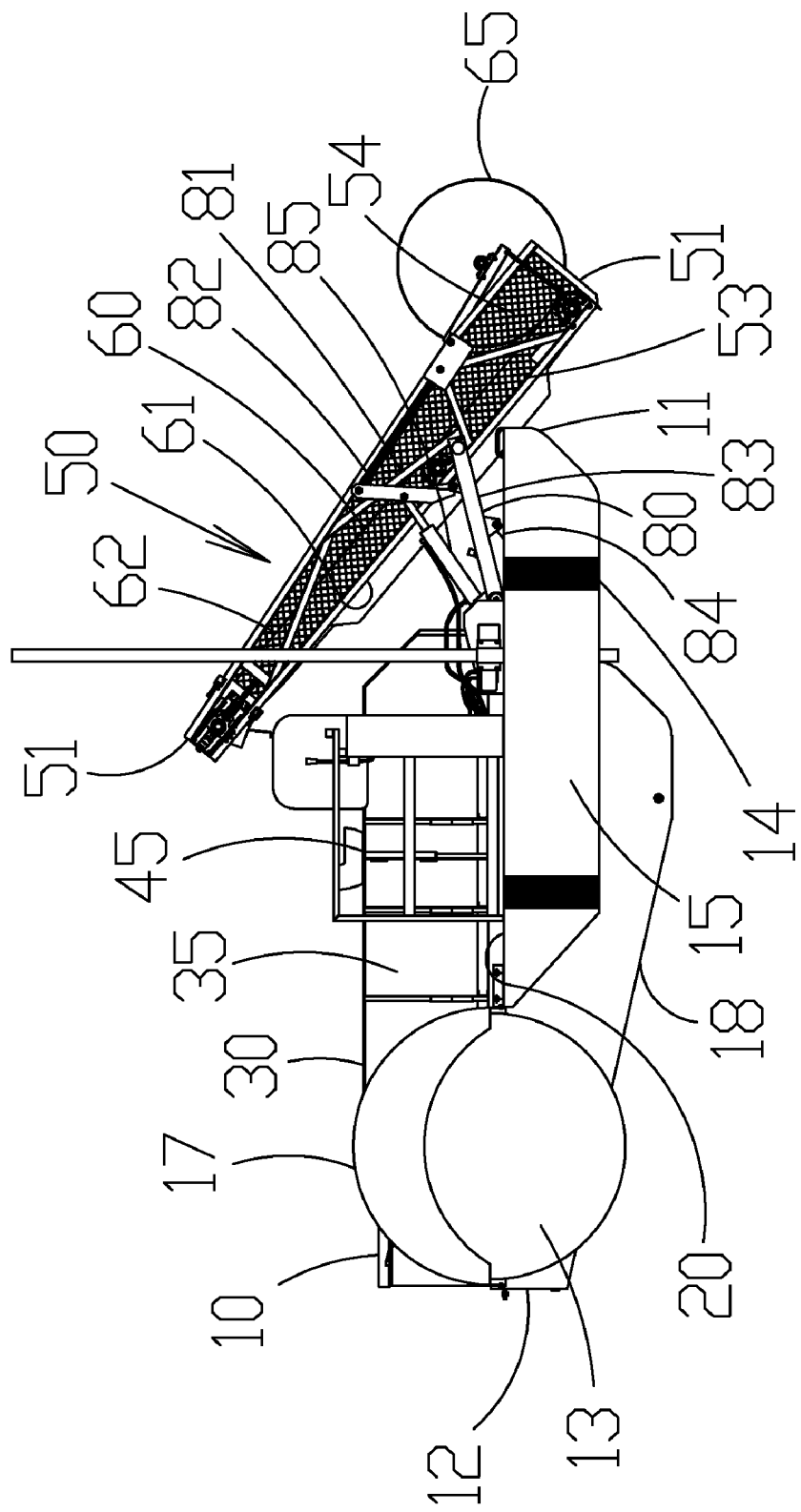
FIG. 1 is a first side view of a preferred embodiment of the present invention shown in a harvest position.
Figure 2:
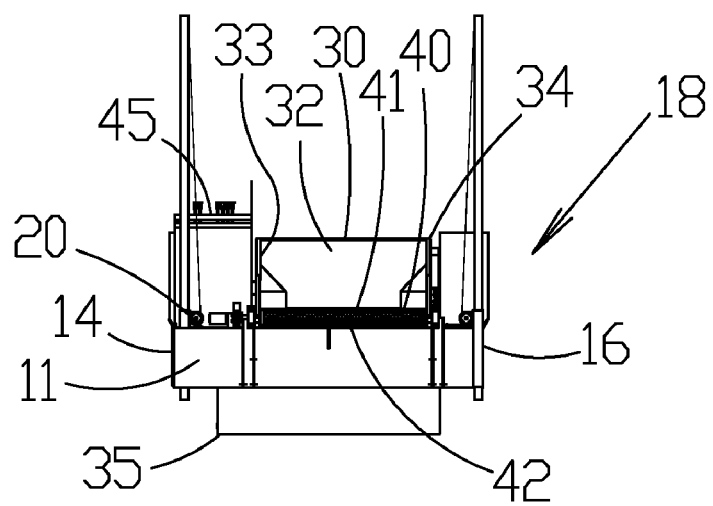
FIG. 2 is a front view of the embodiment shown in FIG. 1 illustrated without the transport assembly.
Figure 3:
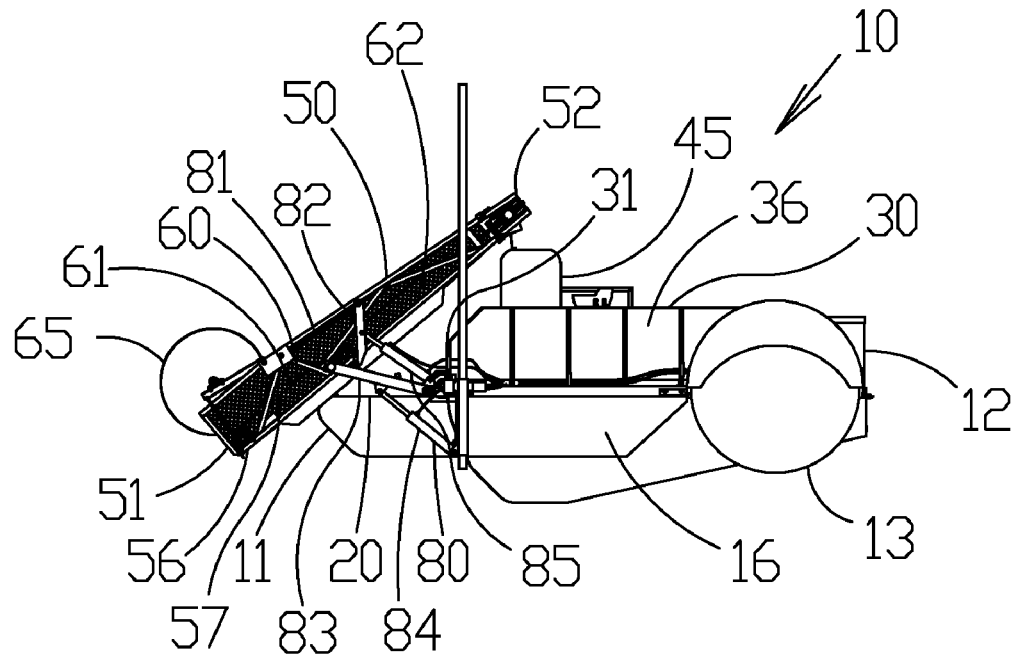
FIG. 3 is an opposed side view of the preferred embodiment shown in FIG. 1.
Figure 4:
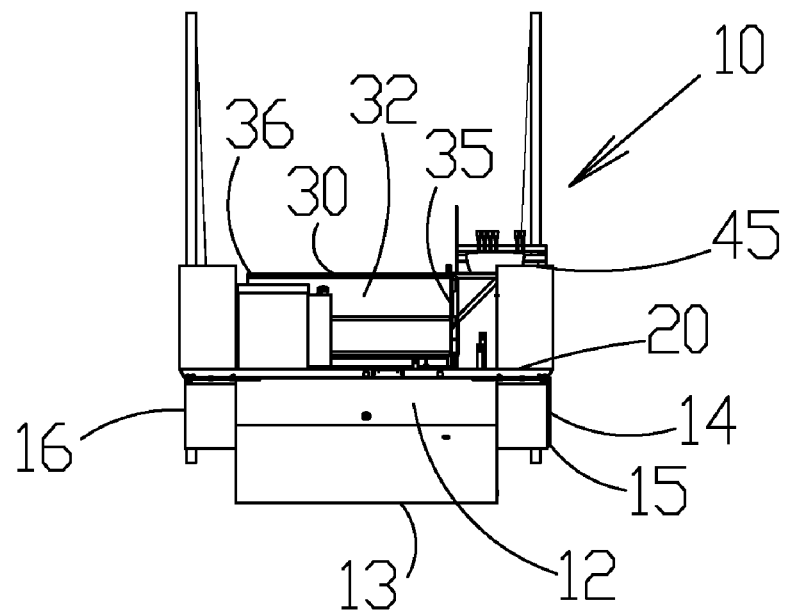
FIG. 4 is a rear view of the embodiment shown in FIG. 1 illustrated without the transport assembly.
Figure 5:
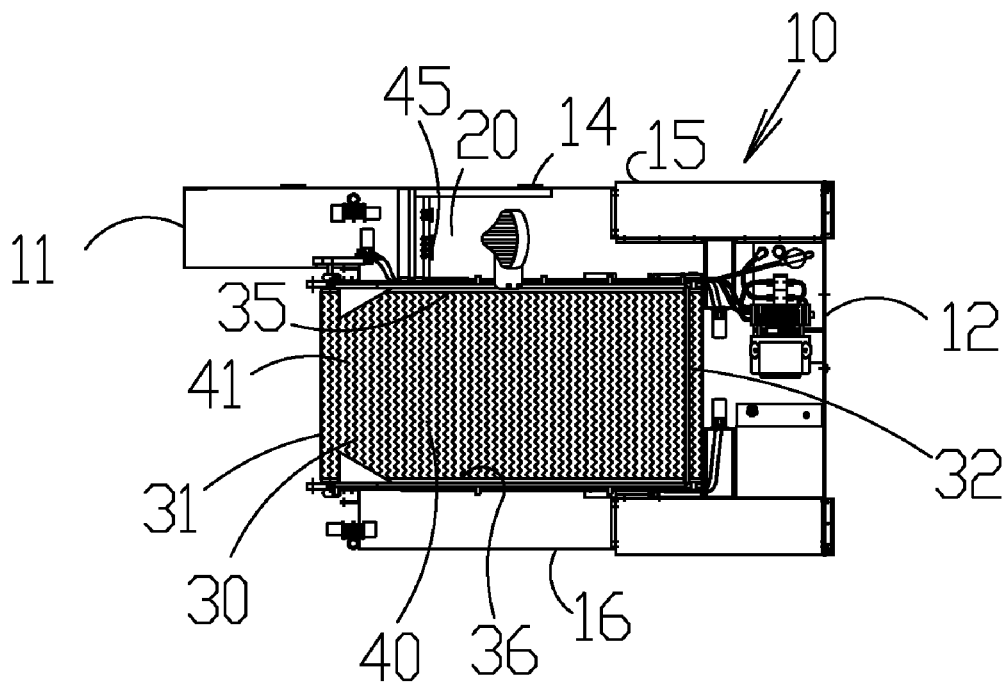
FIG. 5 is a top view of the embodiment shown in FIG. 4.
Figure 6:
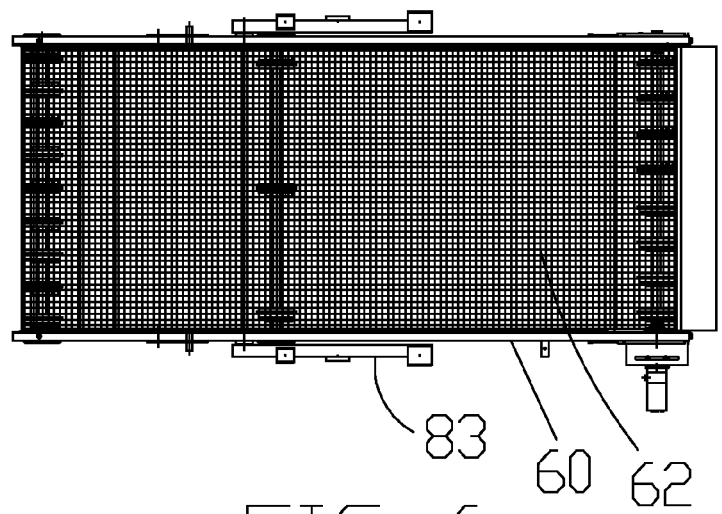
FIG. 6 is a top view of a preferred embodiment of the transport assembly of the present invention.
Figure 7:
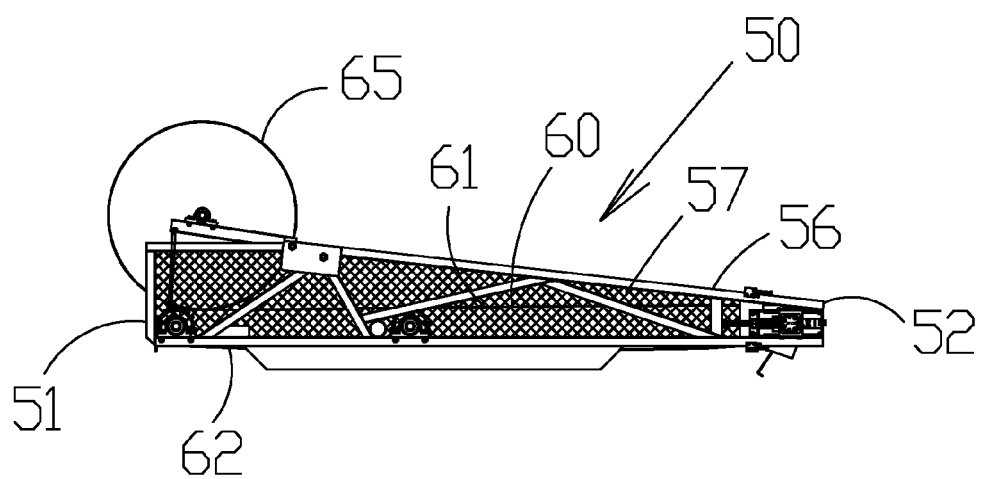
FIG. 7 is a side view of the embodiment of the transport assembly illustrated in FIG. 6.
Figure 8:
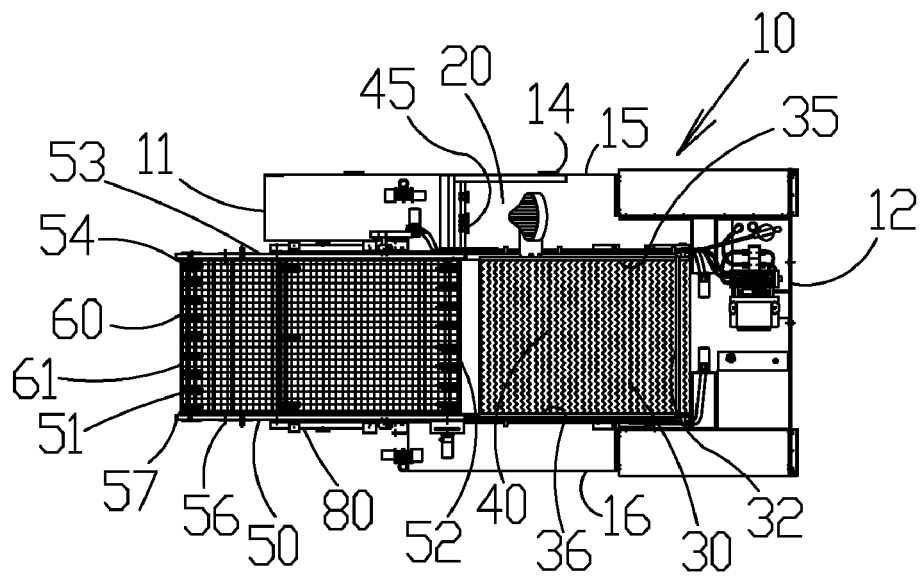
FIG. 8 is a top view of the embodiment illustrated in FIG. 1 shown in a harvest position.
Figure 9:
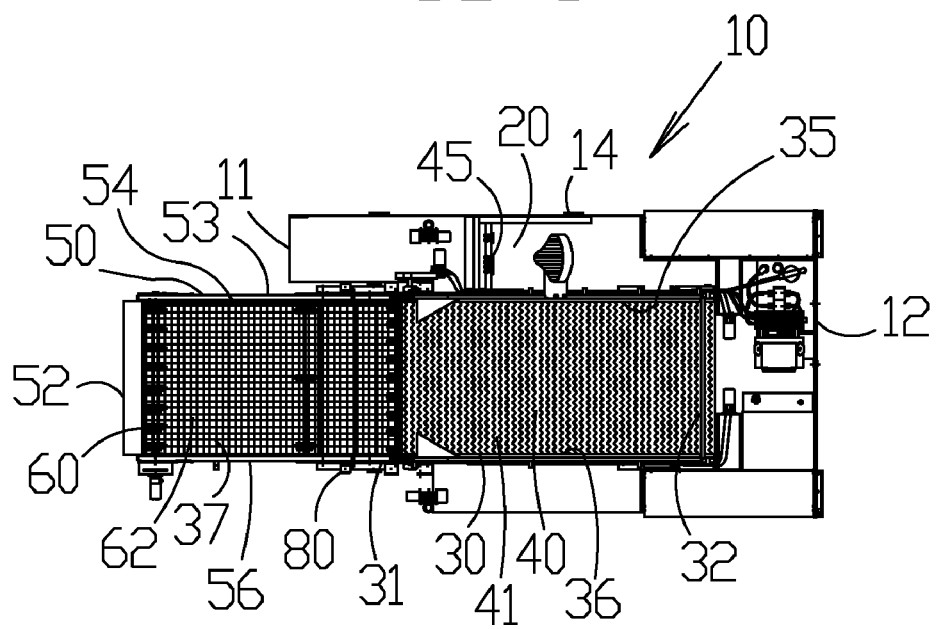
FIG. 9 is a top view of the embodiment illustrated in FIG. 1 shown in a disposal position.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Looking now to FIGS. 1-9, it is seen that a preferred embodiment is illustrated. The materials are preferably made of steel, another metal or other suitably strong and rigid materials. In a broad sense, the harvester 10 can be described as a boat or other aquatic floating device that floats on the water 1 while harvesting lake weeds and can deposit or unload the harvested weeds onto a dock 2 or other disposal location.

The harvester 10 has ends 11 and 12, or alternatively a front and a rear, respectively. Paddles 13 are preferably integrated into or located at end 12. The paddles 13 are used for propulsion of the harvester or vessel. It is appreciated that alternative propulsion mechanisms can be used without departing from the broad aspects of the present invention. The harvester 10 further has sides 15 and 16, a top 17 and a bottom 18. Bumpers 14 can be provided on side 15 for docking purposes. It is appreciated that even though the invention is shown with respect to a preferred layout relative the sides 15 and 16 for purposes of illustration, it is expressly not limited to such layout.

The harvester 10 has a deck 20 for supporting a hopper 30, a control station 45 and a transport assembly 50. The deck 20 can be any suitable deck, but is shown as a flat deck in the preferred embodiment.

Hopper 30 has a front 31 and preferably has three upstanding walls 32, 35 and 36 that may be generally perpendicular to the deck 20, and which define an area on the harvester 10 for storage of harvested weeds and other materials. It is further understood that while a rectangular shaped hopper 30 is illustrated, other shapes may be utilize without departing from the broad aspects of the present invention. A hopper conveyor 40 having a top 41 and a bottom 42 is illustrated. The hopper conveyor can move harvested weeds selectively towards the back of the hopper or the front of the hopper. Alternatively, buckets or collection apparatus may be in the hopper for directly collecting the harvested material.

The control station 45 can be located along one side of the hopper 30. The user can navigate the harvester 10, as well as control the orientation and operation of the transport assembly 50 from the control station 45.

The transport assembly 50 has ends 51 and 52, and has sides 53 and 56. Side 53 has a side wall 54. Side 56 has a side wall 57. Walls 54 and 57 are preferably parallel to each other, and define a boundary in which a conveyor 60 and a roller 65 operate. The transport assembly is preferably located at end 11 of the harvester 10.

The transport assembly conveyor 60 has a load side 61 and an unload side 62, and may be made of a screen material. Yet, it is appreciated that the conveyor can be made of any other suitable material without departing from the broad aspects of the present invention. The conveyor is preferably formed in a continuous strip, and is operable around two roller assemblies. The conveyor 60 can be driven via a drive unit controlled at the control station 45. One suitable drive unit is a chain drive. Yet, it is appreciated that other drive units may be utilized without departing from the broad aspects of the present invention. The drive unit can cause the conveyor to move in a first direction and a second direction.

The transport assembly 50 further can comprise a roller 65. The roller can have fins each with an outer edge that can operably come into close proximity with the conveyor 60. The roller rotates about a central axis. The rotational direction of the roller 65 is preferably opposed to the rotational direction of the conveyor 60. In this regard, weeds and other materials are pressed between the roller and conveyor. The weeds and roots can then be transported up the conveyor in an inclined plane and fall from end 52 of the transport assembly into the hopper 30. The hopper conveyor 40 can operate to move the harvested lake weed to the rear of the hopper to make room for additional harvest.

It is understood that the use of a roller in tandem with a conveyor is a preferred embodiment. It is also possible to use a cutting or other pulling device to harvest the lake weed without departing from the broad aspects of the present invention.

Figure 10:
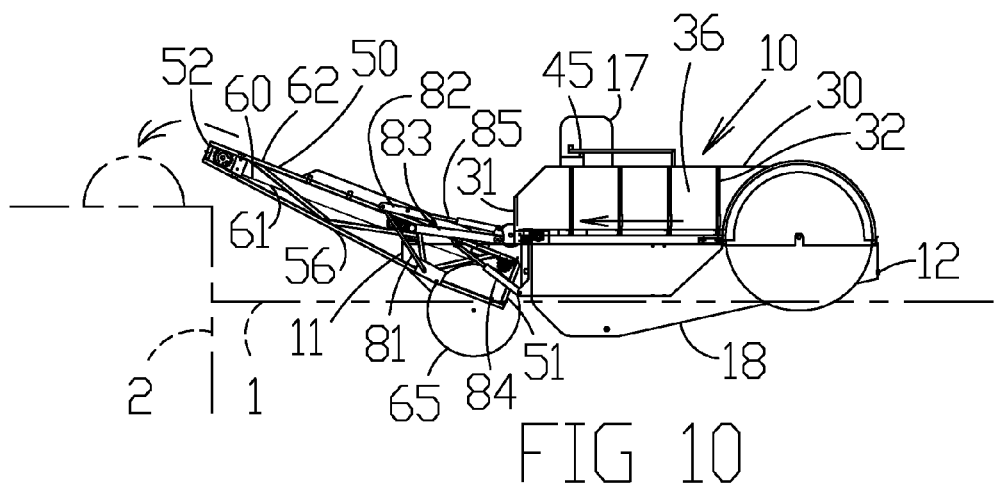
FIG. 10 is a side view showing the transport assembly in the disposal position.
Figure 11:
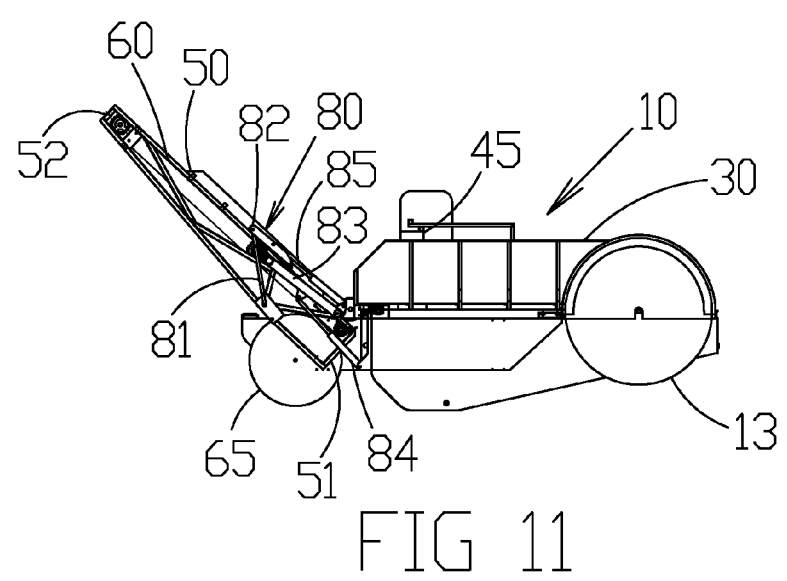
FIG. 11 is a side view showing the transport assembly in a first intermediate position.
Figure 12:
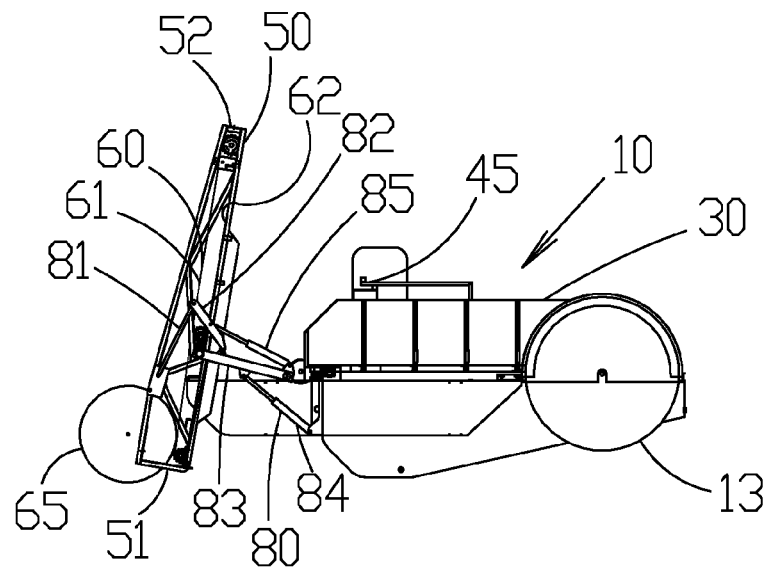
FIG. 12 is a side view showing the transport assembly in a second intermediate position.
Figure 13:
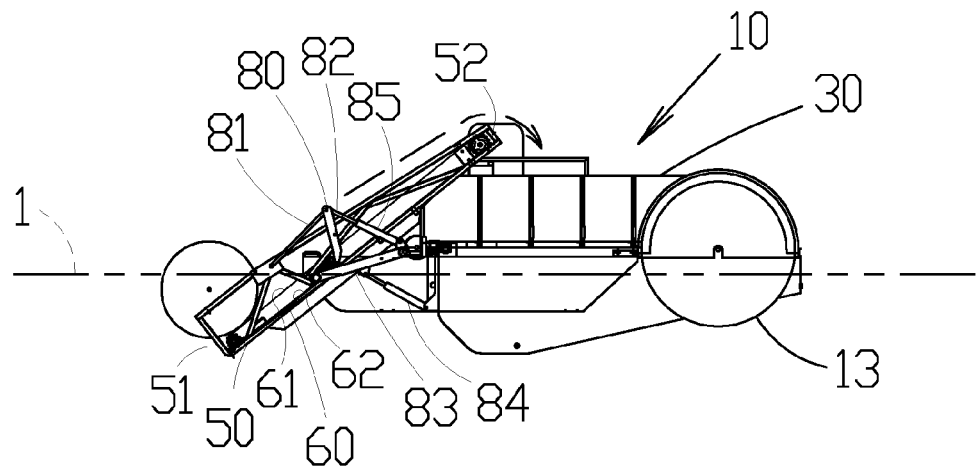
FIG. 13 is a side view showing the transport assembly in the harvest position.

A positioning assembly 80 is provided for moving the transport assembly from a first position, as seen in FIG. 13, through intermediate positions illustrated in FIGS. 11 and 12 to a second position, as seen in FIG. 10. The positioning assembly 80 has a connecting rod 81, a rotational link 82, a lift arm 83 and two actuators 84 and 85, respectively. Actuators 84 and 85 are preferably hydraulic actuators. Yet, it is understood that other types of actuators may be used without departing from the broad aspects of the present invention.

Actuator 84 is pivotally connected to the front 11 of the boat and to the lift arm 83, and is responsible for controlling the vertical location of the transport assembly. Actuator 85 spans between and is pivotally connected to the rotational link 82 and the lift arm 83. Hence, actuator 85 is not directly connected to or fixed to either the boat 10 or the transport assembly 50. The connecting rod 81 is pivotally connected to the transport assembly 50 and the rotational link 82. These components act in tandem, as seen in FIGS. 10-13 to rotationally orient and vertically position the transport assembly 50 relative the boat 10. Extension of the actuator 85 causes the transport assembly to flip from the harvest position to the disposal position.

Removal of the harvested materials from the hopper 30 requires that the transport assembly 50 be pivoted to the unload position, as described above. The pivoting of the transport assembly can be accomplished with a positioning assembly 80, described below. Yet, it is understood that other mechanical devices may be utilized without departing from the broad aspects of the present invention.

Disposal of the harvested goods from the hopper 30 to a disposal point 2 includes operating the hopper conveyer in a second direction whereby harvested lake weed falls off the hopper 30 and onto the unload side 62 of the transport assembly conveyor 60 at the first end 51 of the transport assembly 50. The transport assembly conveyor 60 operates to move material on the conveyor to a disposal point 2, such as another vessel or a point on the shore. It is appreciated that the transport assembly 50 can be oriented to any desired rotational position relative the boat. In the preferred embodiment, the conveyor operates in an inclined plane in the disposal position.

Thus it is apparent that there has been provided, in accordance with the invention, a lake weed harvester that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A lake weed harvester comprising:
   a boat comprising a boat front and a boat rear; and
   a transport assembly operably connected to said boat at said front end, said transport assembly selectably operating in a harvest position to both harvest lake weed and move the harvested lake weed onto said boat and in a removal position to remove the lake weed from said boat, wherein said transport assembly comprises:
   a transport assembly conveyor; and
   a harvesting wheel having a roller rotating about a central axis, said roller having at least one fin that operates in close proximity to said transport assembly conveyor wherein said harvesting wheel and said transport assembly conveyor cooperate to harvest lake weed, said harvesting wheel being above said transport assembly conveyor when said transport assembly is in said harvest position and said harvesting wheel being below said transport assembly conveyor when said transport assembly in is said removal position.

2. The lake weed harvester of claim 1 further comprising a hopper receiving the harvested lake weed from said transport assembly.

3. The lake weed harvester of claim 2 wherein said hopper comprises a hopper front, a hopper first side wall, a hopper second side wall and a hopper end wall.

4. The lake weed harvester of claim 3 wherein said hopper further comprises a hopper conveyor, said hopper conveyor being operable in a first direction towards said end wall and in a second direction towards said hopper front.

5. The lake weed assembly of claim 2 wherein:
said transport assembly has a transport assembly first end and a transport assembly second end;
said transport assembly second end is adjacent to and above said hopper and said transport assembly first end is remote from said hopper when said transport assembly is in said harvest position; and
said transport assembly first end is adjacent to and below said hopper and said transport assembly second end is remote from said hopper when said transport assembly is in said removal position.

6. The lake weed harvester of claim 1 further comprising a positioning assembly selectively positioning said transport assembly between said harvesting position and said removal position.

7. The lake weed harvester of claim 6 wherein said positioning assembly comprises a first actuator and a second actuator.

8. The lake weed harvester of claim 7 wherein said positioning assembly further comprises:
a connecting rod;
a rotational link; and
a lift arm,
wherein:
said first actuator is pivotally connected to said boat and to said lift arm;
said second actuator is pivotally connected to said lift arm and to said rotational link; and
said connecting rod is pivotally connected to said rotational link.

9. The lake weed harvester of claim 1 wherein:
said transport assembly comprises a transport assembly conveyor with a transport assembly conveyor load side operable in a load side inclined plane when said transport assembly is in the harvest position.

10. The lake weed harvester of claim 9 wherein:
said transport assembly conveyor comprises a transport assembly conveyor unload side operable in an unload side inclined plane when said transport assembly is in the removal position, wherein said transport assembly can be selectably flipped wherein one of said load side and said unload side is upwardly facing, and:
said transport assembly is rotationally oriented whereby said load side is upwardly facing when said transport assembly is in said harvest position,
said transport assembly is rotationally oriented whereby said unload side is upwardly facing when said transport assembly is in said removal position, and
said load side and said unload side are opposite sides of said transport assembly conveyor.

11. The lake weed harvester of claim 10 wherein:
said transport assembly conveyor unload side operable in a variably selected unload side inclined plane when said transport assembly is in the removal position.

12. A lake weed harvester comprising:
a boat comprising a boat front and a boat rear;
a transport assembly operably connected to said boat at said boat front and comprising a conveyor, said conveyor having a harvest side that is usable during harvesting lake weed and an unload side that is usable during unloading harvested lake weed; and
a hopper,
wherein said transport assembly is selectively positioned to a harvest position wherein said harvest side is above said unload side to both harvest lake weed and move the harvested lake weed into said hopper and said transport assembly can be selectably flipped to a removal position wherein said unload side is above said harvest side to remove the lake weed from said hopper, and
wherein said harvest side and said unload side are not used simultaneously to convey lake weed.

13. The lake weed harvester of claim 12 wherein said hopper comprises:
a hopper front and a hopper rear wall; and
a hopper conveyor to selectably move the harvested lake weed towards said hopper rear wall when said transport assembly is in said harvest position and towards said hopper front when said transport assembly is in said removal position.

14. The lake weed harvester of claim 13 further comprising a positioning assembly having a first actuator and a second actuator to selectively move said transport assembly between said harvest position and said removal position.

15. The lake weed harvester of claim 13 wherein:
said transport assembly has a transport assembly first end and a transport assembly second end;
said transport assembly second end is adjacent to and above said hopper and said transport assembly first end is remote from said hopper when said transport assembly is in said harvest position; and
said transport assembly first end is adjacent to and below said hopper and said transport assembly second end is remote from said hopper when said transport assembly is selectable flipped from said harvest position to be oriented in said removal position.

16. The lake weed harvester of claim 15 wherein:
said transport assembly conveyor harvest side is operable in a harvest side inclined plane when said transport assembly is in said harvest position; and
said transport assembly conveyor removal side is operable in an unload side inclined plane when said transport assembly is in said removal position.

17. A method of harvesting lake weed from a lake comprising the steps of:
providing a boat floating on the water in close proximity to lake weed, wherein the boat has a transport assembly with a harvest side and an unload side wherein said transport assembly can be selectably flipped to enable lake weed to be conveyable on one of the load side or the unload side, and a hopper;
positioning the transport assembly to a harvest position wherein the harvest side is above the unload side;
harvesting the lake weed, conveying the harvested lake weed across the load side and depositing the harvested lake weed in the hopper;

providing a disposition point remote from the boat;

flipping the transport assembly positioning the transport assembly to an unload position by pivoting the transport assembly wherein the unload side is above the harvest side; and unloading the harvested lake weed from the hopper across the unload side onto the disposition point.

18. The method of claim 17 further comprising the steps of:

providing a hopper conveyor; and actuating the hopper to move the harvested lake weed from the hopper onto the transport assembly.

19. The method of claim 17 wherein:

the step of providing a transport assembly includes the steps of providing a transport assembly conveyor with a transport assembly conveyor harvest side and a transport assembly conveyor unload side;

the step of positioning the transport assembly to the harvest position includes a step of orienting the transport assembly conveyor harvest side to a harvest side incline plane; and the step of positioning the transport assembly to the unload position includes a step of orienting the transport assembly conveyor unload side to an unload side incline plane.

\* \* \* \* \*